US012556310B2

United States Patent
Ko et al.

(10) Patent No.: US 12,556,310 B2
(45) Date of Patent: Feb. 17, 2026

(54) VEHICLE AND METHOD FOR PREVENTING COMMUNICATION COLLISIONS BETWEEN COMMUNICATION TERMINALS PROVIDED IN A VEHICLE

(71) Applicants: HYUNDAI MOTOR COMPANY, Seoul (KR); KIA CORPORATION, Seoul (KR)

(72) Inventors: Jaeyoon Ko, Yongin-si (KR); Minwoo Lee, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 316 days.

(21) Appl. No.: 18/195,733

(22) Filed: May 10, 2023

(65) Prior Publication Data
US 2024/0022353 A1    Jan. 18, 2024

(30) Foreign Application Priority Data
Jul. 13, 2022   (KR) .................. 10-2022-0086334

(51) Int. Cl.
*H04L 1/00*   (2006.01)
*G07C 5/00*   (2006.01)
*H04L 1/18*   (2023.01)

(52) U.S. Cl.
CPC .............. *H04L 1/18* (2013.01); *G07C 5/008* (2013.01)

(58) Field of Classification Search
CPC ......... H04L 1/18; G07C 5/008; G07C 5/0808; H04W 24/02; H04W 4/90; H04W 76/50
See application file for complete search history.

(56) References Cited

U.S. PATENT DOCUMENTS

| 5,745,048 A | * | 4/1998 | Taguchi ................. H04Q 9/14 370/282 |
| 8,032,108 B2 | | 10/2011 | Kuz et al. |
| 8,849,237 B2 | | 9/2014 | Bourdu et al. |
| 8,989,697 B2 | | 3/2015 | Leung et al. |

(Continued)

FOREIGN PATENT DOCUMENTS

| JP | 2016059008 A | * | 4/2016 | |
| KR | 20090000008 A | * | 1/2009 | ............. G06Q 50/40 |

(Continued)

OTHER PUBLICATIONS

Machine Translation of JP2016059008 (Year: 2016).*

(Continued)

*Primary Examiner* — Anne Marie Antonucci
*Assistant Examiner* — Jordan T Smith
(74) *Attorney, Agent, or Firm* — Lempia Summerfield Katz LLC

(57) ABSTRACT

A vehicle includes a first communication terminal; a second communication terminal; and a controller configured to transmit vehicle identification information of the vehicle to the first communication terminal or the second communication terminal according to a request from the first communication terminal or the second communication terminal. The first communication terminal is configured to transmit, to the controller, a first request message for requesting the vehicle identification information at a first point in time that a first preset period of time has elapsed from a point in time that an ignition of the vehicle was turned on. The second communication terminal is configured to transmit, to the controller, a second request message for requesting the vehicle identification information at a second point in time that a shorter second preset period of time has elapsed from the point in time that the vehicle's ignition was turned on.

17 Claims, 8 Drawing Sheets

(56) References Cited

U.S. PATENT DOCUMENTS

| | | | |
|---|---|---|---|
| 9,978,187 B2* | 5/2018 | Oda | G07C 5/008 |
| 10,419,916 B1 | 9/2019 | Lei et al. | |
| 10,665,040 B2* | 5/2020 | Colvin | G07C 5/085 |
| 2007/0142026 A1 | 6/2007 | Kuz et al. | |
| 2012/0289182 A1 | 11/2012 | Bourdu et al. | |
| 2018/0374286 A1* | 12/2018 | Kim | H04L 43/50 |
| 2019/0079842 A1* | 3/2019 | Chae | G06F 11/3006 |
| 2020/0394853 A1* | 12/2020 | Jung | H04L 43/0864 |
| 2022/0215693 A1* | 7/2022 | Burger | H04L 12/40 |
| 2023/0318861 A1* | 10/2023 | Tokunaga | H04L 12/40039 |
| | | | 370/468 |

FOREIGN PATENT DOCUMENTS

| | | |
|---|---|---|
| KR | 100927597 B1 | 11/2009 |
| KR | 20130137245 A | 12/2013 |
| KR | 20160106997 A | 9/2016 |
| KR | 20160117038 A | 10/2016 |
| KR | 20200136758 A | 12/2020 |
| WO | 2005004519 A1 | 1/2005 |

OTHER PUBLICATIONS

S. Lee, H. J. Jo, A. Cho, D. H. Lee and W. Choi, "TTIDS: Transmission-Resuming Time-Based Intrusion Detection System for Controller Area Network (CAN)," in IEEE Access, vol. 10, pp. 52139-52153, 2022, doi: 10.1109/ACCESS.2022.3174356 (Year: 2022).*

Machine Translation of KR20090000008 (Year: 2009).*

* cited by examiner

VEHICLE AND METHOD FOR PREVENTING COMMUNICATION COLLISIONS BETWEEN COMMUNICATION TERMINALS PROVIDED IN A VEHICLE

CROSS-REFERENCE TO RELATED APPLICATION

This application is based on and claims priority under 35 U.S.C. § 119 to Korean Patent Application No. 10-2022-0086334, filed on Jul. 13, 2022 in the Korean Intellectual Property Office, the disclosure of which is incorporated herein by reference.

TECHNICAL FIELD

The present disclosure relates to a vehicle configured for preventing a communication collision between communication terminals and a method for preventing a communication collision between communication terminals provided in the vehicle.

BACKGROUND

Recently, the number of vehicles equipped with a telematics terminal has increased due to the development of vehicle IT technology.

'Telematics' is a term that combines telecommunication and informatics, and 'telematics' is defined as a next-generation information provision service for vehicles where an IT industry and an automobile industry are combined.

Through a vehicle telematics service where a mobile communication technology and a global positioning system (GPS) are applied to a vehicle, a driver may be provided with information about vehicle accident, vehicle theft detection, route guidance, traffic and living information, remote vehicle diagnostic service, financial service, game, etc., in real time.

A telematics terminal may wirelessly communicate with a server for providing a telematics service through the Internet and provide occupants in a vehicle with a variety of infotainment services.

Also, an eCall terminal for providing an eCall service that provides safety-related information using a wireless communication network has been recently provided in a vehicle, in order to provide an emergency service required in the event of an accident.

The telematics terminal and the eCall terminal receive vehicle identification information from a controller of vehicle using a vehicle diagnostic communication protocol. When both the telematics terminal and the eCall terminal request the vehicle identification information, a communication collision may occur.

Also, according to the rules, when an on-board diagnostics is connected to a vehicle, a telematics terminal may not request a controller for vehicle identification information. Therefore, the telematics terminal frequently erroneously determines diagnostic communication of the eCall terminal as diagnostic communication of the on-board diagnostics, and a telematics service may be prevented from being provided.

SUMMARY

An aspect of the disclosure provides a vehicle and a method that may prevent a communication collision between communication terminals and thus may smoothly provide a user with a service by the communication terminals.

Additional aspects of the disclosure, in part, are set forth in the following description and, in part, should be apparent from the present description. Alternatively, additional aspects of the disclosure may be learned by practice of the present disclosure.

According to an embodiment of the disclosure, a vehicle includes: a first communication terminal provided in the vehicle; a second communication terminal provided in the vehicle; and a controller configured to transmit vehicle identification information of the vehicle to the first communication terminal or the second communication terminal according to a request from the first communication terminal or the second communication terminal. The first communication terminal may be configured to transmit, to the controller, a first request message for requesting the vehicle identification information at a first point in time that a first preset period of time has elapsed from a point in time that an ignition of the vehicle was turned on. The second communication terminal may be configured to transmit, to the controller, a second request message for requesting the vehicle identification information at a second point in time that a second preset period of time has elapsed from the point in time that the vehicle's ignition was turned on. The second preset period of time is shorter than the first preset period of time.

Also, the first communication terminal may be configured to determine a receiving object of a diagnostic success message based on a connection state of an on-board diagnostics, in response to the diagnostic success message being output from the controller before the first point in time.

Also, the first communication terminal may be configured to determine the on-board diagnostics as the receiving object of the diagnostic success message based on a determination that the on-board diagnostics is connected to the vehicle. The first communication terminal may be further configured to determine the second communication terminal as the receiving object of the diagnostic success message based on a determination that the on-board diagnostics is not connected to the vehicle.

Also, the first communication terminal may be configured to transmit the first request message to the controller at the first point in time, based on a determination that the receiving object of the diagnostic success message is the second communication terminal.

Also, the first communication terminal may be configured not to transmit the first request message to the controller until the vehicle's ignition is turned off, based on a determination that the receiving object of the diagnostic success message is the on-board diagnostics.

Also, in response to a diagnostic failure message being output from the controller before the first point in time, the first communication terminal may be configured to transmit the first request message to the controller at a third point in time that a preset period of time has elapsed from the first point in time, instead of outputting the first request message at the first point in time.

Also, the second communication terminal may be configured not to transmit the second request message to the controller until the vehicle's ignition is turned off, based on a diagnostic success message output from the controller.

Also, the controller may be configured to output a diagnostic failure message based on an occurrence of a collision between the first request message and the second request message. The first communication terminal may be configured to retransmit the first request message to the controller after a threshold period of time elapses, based on the received diagnostic failure message. The second communication terminal may be configured not to transmit the second request message to the controller until the vehicle's ignition is turned off, based on the received diagnostic failure message.

Also, the first communication terminal may be configured to establish communication with a first server providing an infotainment service, based on the received vehicle identification information. The second communication terminal may be configured to establish communication with a second server providing an eCall service, based on the received vehicle identification information.

According to an embodiment of the disclosure, a method for preventing a communication collision between a first communication terminal and a second communication terminal, both of which are provided in a vehicle, is provided. The method includes transmitting, by the first communication terminal, a first request message for requesting vehicle identification information of the vehicle to a controller at a first point in time that a first preset period of time has elapsed from a point in time that an ignition of the vehicle was turned on. The method also includes transmitting, by the second communication terminal, a second request message for requesting the vehicle identification information to the controller at a second point in time that a second preset period of time has elapsed from the point in time that the vehicle's ignition was turned on, the second preset period of time being shorter than the first preset period of time.

Also, the method further includes determining, by the first communication terminal, a receiving object of a diagnostic success message based on a connection state of an on-board diagnostics, in response to the diagnostic success message being output from the controller before the first point in time.

Also, determining the receiving object of the diagnostic success message includes determining the on-board diagnostics as the receiving object of the diagnostic success message based on a determination that the on-board diagnostics is connected to the vehicle. Further, determining the receiving object of the diagnostic success message also includes determining the second communication terminal as the receiving object of the diagnostic success message based on a determination that the on-board diagnostics is not connected to the vehicle.

Also, the transmitting of the first request message to the controller by the first communication terminal is performed only when the receiving object of the diagnostic success message is determined as the second communication terminal.

Also, the method further includes not transmitting, by the first communication terminal, the first request message to the controller until the vehicle's ignition is turned off, based on a determination that the receiving object of the diagnostic success message is the on-board diagnostics.

Also, the method further includes, in response to a diagnostic failure message being output from the controller before the first point in time, transmitting, by the first communication terminal, the first request message to the controller at a third point in time that a preset period of time has elapsed from the first point in time, instead of outputting the first request message at the first point in time.

Also, the method further includes not transmitting, by the second communication terminal, the second request message to the controller until the vehicle's ignition is turned off, based on a diagnostic success message output from the controller.

Also, the method further includes outputting, by the controller, a diagnostic failure message based on an occurrence of a collision between the first request message and the second request message. The method further includes retransmitting, by the first communication terminal, the first request message to the controller after a threshold period of time elapses, based on the received diagnostic failure message. The method further includes not transmitting, by the second communication terminal, the second request message to the controller until the vehicle's ignition is turned off, based on the received diagnostic failure message.

Also, the first communication terminal may be configured to establish communication with a first server providing an infotainment service, based on the received vehicle identification information. The second communication terminal may be configured to establish communication with a second server providing an eCall service, based on the received vehicle identification information.

According to another embodiment of the disclosure, a vehicle includes: a first communication terminal provided in the vehicle; a second communication terminal provided in the vehicle; a communication interface for communication of the first communication terminal and the second communication terminal; and a controller configured to transmit vehicle identification information of the vehicle to the first communication terminal according to a request from the first communication terminal. The first communication terminal may be configured to transmit, to the controller, a request message for requesting the vehicle identification information, based on a preset period of time having elapsed from a point in time that an ignition of the vehicle was turned on. The first communication terminal may be configured to further transmit, to the second communication terminal, the vehicle identification information through the communication interface based on the received vehicle identification information from the controller.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
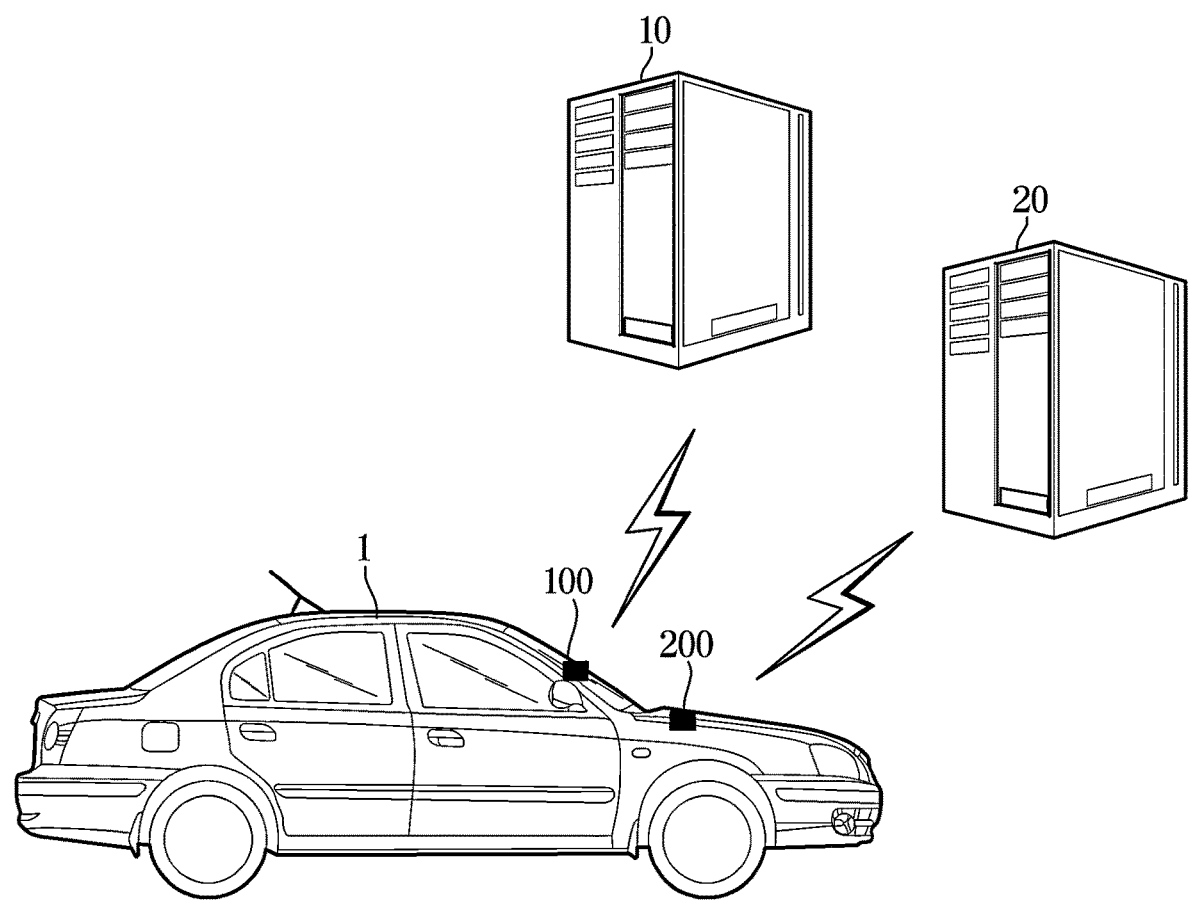
FIG. 1 schematically illustrates an example where a plurality of communication terminals provided in a vehicle according to an embodiment communicate with different servers, respectively.

Advantages and features of embodiments and methods of achieving the embodiments should be clearly understood with reference to the accompanying drawings and the following detailed embodiments. However, the present disclosure is not limited to embodiments described herein but may be implemented in various different forms. Embodiments are provided in order to explain the present inventive concept for those having ordinary skill in the art. The scope of the present inventive concept is defined by the appended claims.

The terms used herein are briefly described and embodiments are described in detail.

Although the terms used herein are selected from among general terms that are currently and widely used in consideration of functions in embodiments, these may be changed according to intentions or customs of those having ordinary skill in the art or the advent of new technology. In addition, in a specific case, some terms may be arbitrary selected by applicants. In this case, meanings thereof are described in a corresponding description of embodiments. Therefore, the meanings of terms used herein should be interpreted based on substantial meanings of the terms and content of this entire present disclosure and should not be interpreted simply based on the terms themselves.

Throughout this present disclosure, when a certain part "includes" a certain component, it means that another component may be further included not excluding another component unless otherwise defined. Moreover, terms described in the present disclosure, such as "part," refer to a unit of processing at least one function or operation. The terms described in the present disclosure, such as "part," may be implemented by software, a hardware component, such as a field-programmable gate array (FPGA) or an application-specific integrated circuit (ASIC), or a combination of software and hardware. However, the term "part" is not limited to software or hardware. "Part" may be configured in a recording medium that may be addressed or may be configured to be reproduced on at least one processor. Therefore, examples of the term "part" includes software components, object-oriented software components, components, such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality. When a component, device, element, or the like of the present disclosure is described as having a purpose or performing an operation, function, or the like, the component, device, or element should be considered herein as being "configured to" meet that purpose or to perform that operation or function.

Reference numerals used for method steps are just used for convenience of explanation but are not intended to limit an order of the steps. Thus, unless the context clearly dictates otherwise, the written order may be practiced otherwise.

Hereinafter, embodiments of a vehicle and a method for preventing a communication collision between communication terminals provided in the vehicle are described in detail with reference to the accompanying drawings. In addition, parts irrelevant to description are omitted in the drawings in order to clearly explain embodiments. In the accompanying drawings, parts that are identical or equivalent to each other should be assigned the same reference numerals, and in the following description of the embodiments, details of redundant descriptions thereof have been omitted.

Figure 2:
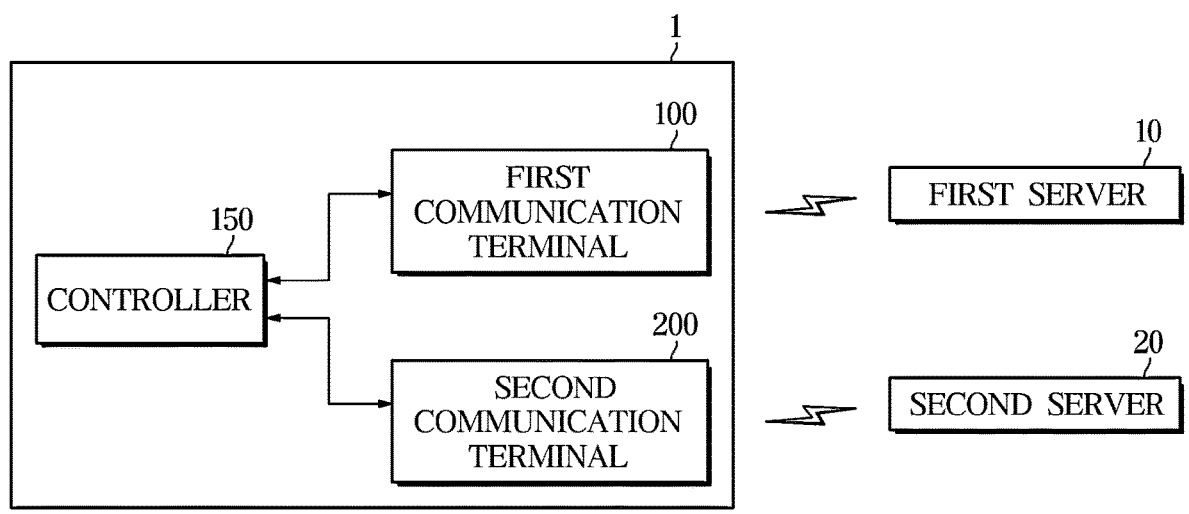
FIG. 2 is a block diagram schematically illustrating a configuration of a vehicle according to an embodiment.

FIG. 1 schematically illustrates an example where a plurality of communication terminals provided in a vehicle according to an embodiment communicate with different servers, respectively. FIG. 2 is a block diagram schematically illustrating a configuration of a vehicle according to an embodiment.

Referring to FIGS. 1 and 2, a vehicle 1 according to an embodiment may include a plurality of communication terminals 100 and 200.

For example, the plurality of communication terminals 100 and 200 may include the first communication terminal 100 and the second communication terminal 200.

The first and second communication terminals 100 and 200 may be provided in the vehicle 1 and provide a user with different services, respectively.

For example, the first communication terminal 100 may provide the user with an infotainment service, and the second communication terminal 200 may provide the user with an eCall service.

The first communication terminal 100 is a dedicated terminal for telematics and may be referred to as a telematics terminal (or connected car terminal).

According to various embodiments, the first communication terminal 100 may be implemented in an integrated form in an audio, video, navigation (AVN) device of the vehicle 1.

The first communication terminal 100 may communicate with a first server 10 through a base station of a mobile telecommunications operator. In this instance, the first server 10 may refer to a server providing an infotainment service (or telematics service) to the vehicle 1.

The first server 10 may provide the user with the infotainment service (e.g., vehicle accident, vehicle theft detection, route guidance, traffic and living information, remote vehicle diagnostic service, financial service, game, etc.) in real time, through communication with the first communication terminal 100 of the vehicle 1.

The first communication terminal 100 may include a communication module communicating with the first server 10, a memory storing a software for controlling the communication module, a processor controlling an operation of the first communication terminal 100 based on the software stored in the memory, and/or a user interface.

The first communication terminal 100 may communicate with the first server by including the communication module (e.g., a communication modem). Here, the communication module may provide a 4G communication function, such as long term evolution (LTE), as well as a 2G or 3G communication function.

The communication module of the first communication terminal 100 may be connected to an integrated antenna mounted on the vehicle 1 and may transmit and receive a wireless signal to and from a mobile communication network via the integrated antenna. Data processed by the communication module may be transmitted to the processor, or to the mobile communication network connected through the integrated antenna.

Also, the communication module of the first communication terminal 100 may include an interface capable of communicating with a user terminal. In this case, the communication module may communicate with the user terminal through Wi-Fi, Bluetooth, etc., without being limited thereto.

At least one memory of the first communication terminal 100 may store various data required for operations of the first communication terminal 100. The memory may store an operating system required to drive the first communication terminal 100 or various applications required to provide information.

Also, the memory may store a control program for controlling the first communication terminal 100 (e.g., a software for providing the infotainment service) and may control data for controlling operations of the first communication terminal 100. In addition, the memory may store operation data generated while performing a predetermined operation of the first communication terminal 100.

The above-described memory may include at least one of a flash memory, hard disc, card-type memory (e.g., SD memory, XD memory, etc.), random access memory (RAM), static random access memory (SRAM), read only memory (ROM), programmable read only memory (PROM), electrically erasable programmable read only memory (EEPROM), magnetic memory, magnetic disc, or optical disk.

At least one processor of the first communication terminal 100 may control overall operations of the first communication terminal 100 based on the control program and control data stored in the memory.

The processor may control operations of a variety of modules, devices, etc. embedded in the first communication terminal 100.

For example, the processor may control the communication module based on the software stored in the memory.

In an embodiment, the processor may generate a control signal for controlling the various modules, devices, etc. embedded in the first communication terminal 100 and may control the operations of each of the aforementioned constituent components. Also, the processor may output an image or music according to a control command of a user terminal paired with the first communication terminal 100. When the user terminal is operated, the processor may control modules installed in the vehicle 1 using information of the user terminal.

The user interface of the first communication terminal 100 may include a display outputting various data and an inputter receiving various user inputs.

The second communication terminal 200 is a dedicated terminal for eCall service and may be referred to as an eCall terminal.

The second communication terminal 200 may communicate with a second server 20 through a base station of a mobile telecommunications operator. In this instance, the second server 20 may refer to a server providing the vehicle 1 with an emergency service. For example, the second server 20 may refer to a public safety answering point (PSAP) server.

Through communication with the second communication terminal 200 of the vehicle 1, the second server 20 may provide a user with the emergency service (e.g., crime report, fire report, accident report, etc.).

For example, the second communication terminal 200 may transmit, to the second server 20, information obtained from a plurality of sensors (e.g., microphone, seat sensor, airbag sensor, etc.) provided in the vehicle 1, and the second server 20 may provide a variety of emergency services based on the information received from the second communication terminal 200.

The second communication terminal 200 may include a communication module communicating with the second server 20, a memory storing a software for controlling the communication module, a processor controlling an operation of the second communication terminal 200 based on the software stored in the memory, and/or a user interface.

The communication module of the second communication terminal 200 may communicate with the second server 20 by including the communication module (e.g., a communication modem). Here, the communication module may provide a 4G communication function, such as LTE, as well as a 2G or 3G communication function.

The communication module of the second communication terminal 200 may be connected to an integrated antenna mounted on the vehicle 1 and may transmit and receive a wireless signal to and from a mobile communication network via the integrated antenna. Data processed by the communication module may be transmitted to the processor or to the mobile communication network connected through the integrated antenna.

Also, the communication module of the second communication terminal 200 may include an interface capable of communicating with a user terminal. In this case, the communication module may communicate with the user terminal through Wi-Fi, Bluetooth, etc., without being limited thereto.

At least one memory of the second communication terminal 200 may store various data required for operations of the second communication terminal 200. The memory may store an operating system required to drive the second communication terminal 200 or various applications required to provide information.

Also, the memory may store a control program for controlling the second communication terminal 200 (e.g., a software for providing the eCall service) and may control data for controlling operations of the second communication terminal 200. In addition, the memory may store operation data generated while performing a predetermined operation of the second communication terminal 200.

The above-described memory may include at least one of a flash memory, hard disc, card-type memory (e.g., SD memory, XD memory, etc.), random access memory (RAM), static random access memory (SRAM), read only memory (ROM), programmable read only memory (PROM), electrically erasable programmable read only memory (EEPROM), magnetic memory, magnetic disc, or optical disk.

At least one processor of the second communication terminal 200 may control overall operations of the second communication terminal 200 based on the control program and control data stored in the memory.

The processor may control operations of a variety of modules, devices, etc. embedded in the second communication terminal 200.

For example, the processor may control the communication module based on the software stored in the memory.

In an embodiment, the processor may generate a control signal for controlling the various modules, devices, etc.

embedded in the second communication terminal 200 and may control the operations of each of the aforementioned constituent components.

The user interface of the second communication terminal 200 may include a display outputting various data and an inputter receiving various user inputs. For example, in an event of vehicle collision, a user may input a phone number that the user desires to make a call through the user interface.

A base station of mobile telecommunications operator may use a variety of wireless access systems, such as a code division multiple access (CDMA), frequency division multiple access (FDMA), time division multiple access (TDMA), orthogonal frequency division multiple access (OFDMA), single carrier frequency division multiple access (SCFDMA), etc. CDMA may be implemented with a radio technology, such as a universal terrestrial radio access (UTRA) or CDMA 2000. TDMA may be implemented with a radio technology, such as global system for mobile communications (GSM)/general packet radio service (GPRS)/enhanced data rates for GSM evolution (EDGE). OFDMA may be implemented with a radio technology such as IEEE 802.11 (Wi-Fi), IEEE 802.16 (WiMAX), IEEE 802.20, evolved UTRA (E-UTRA), and the like. UTRA may be part of universal mobile telecommunications system (UMTS).

3G communication in the 3rd generation partnership project 2 (3GPP2) standard corresponds to CDMA2000 and uses a 1.5 MHz bandwidth carrier.

3G communication in the 3GPP standard corresponds to WCDMA or UMTS and uses a 5 MHz bandwidth carrier.

LTE in the 3GPP standard is part of evolved UMTS (E-UMTS) using E-UTRA and employs OFDMA in downlink and employs SCFDMA in uplink. LTE-advanced (LTE-A) is an evolved version of 3GPP LTE and is referred to as 4G communication to be distinguished from 3G communication described above.

4G communication in the 3GPP standard may use a bandwidth carrier ranging from 700 MHz to 2.6 GHz.

A base station of mobile telecommunications operator may provide a plurality of wireless communication networks to which a plurality of communication standards is applied.

According to various embodiments, the vehicle 1 may include an engine vehicle that transmits a driving force to vehicle wheels through an engine. The vehicle 1 may also include an electric vehicle that transmits a driving force to wheels through a motor.

When the vehicle 1 is an engine vehicle, a controller 150 may refer to an engine management system (EMS) for detecting an operation state of engine and providing diagnostic information of the vehicle 1.

When the vehicle 1 is an electric vehicle, the controller 150 may refer to a vehicle control unit (VCU) for performing control required to drive the electric vehicle.

The first communication terminal 100 and the second communication terminal 200 may communicate with the controller 150 through a diagnostic communication protocol of the vehicle 1.

In other words, the controller 150 may perform diagnostic communication with the first communication terminal 100 and the second communication terminal 200.

When a diagnostic device (e.g., the first communication terminal 100 or the second communication terminal 200) requests the controller 150 for a specific command, the controller 150 responds thereto.

According to various embodiments, when receiving a diagnostic command from the diagnostic device (e.g., the first communication terminal 100 or the second communication terminal 200), the controller 150 may be designed to respond within a threshold period of time (e.g., 50 ms).

When the controller 150 may not respond to the request from the diagnostic device (e.g., the first communication terminal 100 or the second communication terminal 200) within the threshold period of time, the controller 150 may transmit a pending message indicating that the request is pending to the diagnostic device.

The first communication terminal 100 may transmit a first request message for requesting vehicle identification information to the controller 150, and the controller 150 may transmit vehicle identification information of the vehicle 1 (hereinafter, 'vehicle identification information') to the first communication terminal 100 based on the received first request message.

The first communication terminal 100 may establish communication with the first server 10 using the vehicle identification information received from the controller 150.

For example, after obtaining the vehicle identification information through the controller 150, the first communication terminal 100 may establish communication with the first server 10 by transmitting and receiving a message including the vehicle identification information to and from the first server 10 through a wireless communication network of mobile telecommunications operator.

Likewise, the second communication terminal 200 may transmit a second request message for requesting vehicle identification information to the controller 150. The controller 150 may transmit the vehicle identification information to the second communication terminal 200 based on the received second request message.

The second communication terminal 200 may establish communication with the second server 20 using the vehicle identification information received from the controller 150.

For example, after obtaining the vehicle identification information through the controller 150, the second communication terminal 200 may establish communication with the second server 20 by transmitting and receiving a message including the vehicle identification information to and from the second server 20 through a wireless communication network of mobile telecommunications operator.

For example, the vehicle identification information may include a vehicle identification number (VIN) and/or a personal identification number (PIN), without being limited thereto.

The first communication terminal 100 and/or the second communication terminal 200 may confirm a diagnostic message output from the controller 150. In this instance, the diagnostic message refers to a message output from the controller 150 through diagnostic communication.

For example, when the controller 150 outputs a diagnostic message according to a request from another constituent component (e.g., the second communication terminal 200), the first communication terminal 100 may receive the output diagnostic message.

Meanwhile, when an on-board diagnostics 30 is connected to the vehicle 1, the controller 150 may transmit diagnostic information of the vehicle 1 to the on-board diagnostics 30 according to a request from the on-board diagnostics 30.

The on-board diagnostics 30 is a device for diagnosing a state of the vehicle 1 and notifying a result of diagnosis. The on-board diagnostics 30 may receive information about the state of the vehicle 1 and/or information about major systems of the vehicle 1 from the controller 150 using the diagnostic communication protocol and notify a user of the received information.

The on-board diagnostics 30 may allow a user to see the information about major systems of the vehicle 1 and information about a failure, etc. transmitted to the controller 150 from sensors of the vehicle 1 according to an OBD standard, through a console of the vehicle 1 or an external device, using a serial communication function.

For example, based on establishing communication with an in-vehicle communication network (e.g., diagnostic communication network) of the vehicle 1, the on-board diagnostics 30 may request the controller 150 for information, receive the requested information, and display the information.

In other words, the on-board diagnostics 30 may communicate with the controller 150 provided in the vehicle 1 using the diagnostic communication protocol.

To this end, the on-board diagnostics 30 may be connected to an OBD mounting part provided in the vehicle 1. The OBD mounting part in the vehicle 1 may be provided under a steering wheel, without being limited thereto.

In an embodiment, the on-board diagnostics 30 may transmit information about the vehicle 1 received through the diagnostic communication network of the vehicle 1 to an external electronic device (e.g., tablet PC) using wireless communication (Bluetooth).

According to the rules, when the on-board diagnostics 30 is connected to the vehicle 1, the controller 150 is designed not to perform diagnostic communication with another constituent component other than the on-board diagnostics 30.

In existing technologies, when a diagnostic message is output from a controller before requesting the controller for vehicle identification information, a first communication terminal or a second communication terminal is incapable of identifying which constituent component requested the diagnostic message, which is output from the controller. Accordingly, when the diagnostic message is output from the controller before requesting the controller for the vehicle identification information, the first communication terminal or the second communication terminal determines that the diagnostic message is output from the controller in response to a request from an on-board diagnostics, thereby not requesting the controller for the vehicle identification information.

Therefore, the first communication terminal is incapable of establishing communication with a first server, even when the diagnostic message output from the controller is output in response to a request from the second communication terminal.

Figure 3:
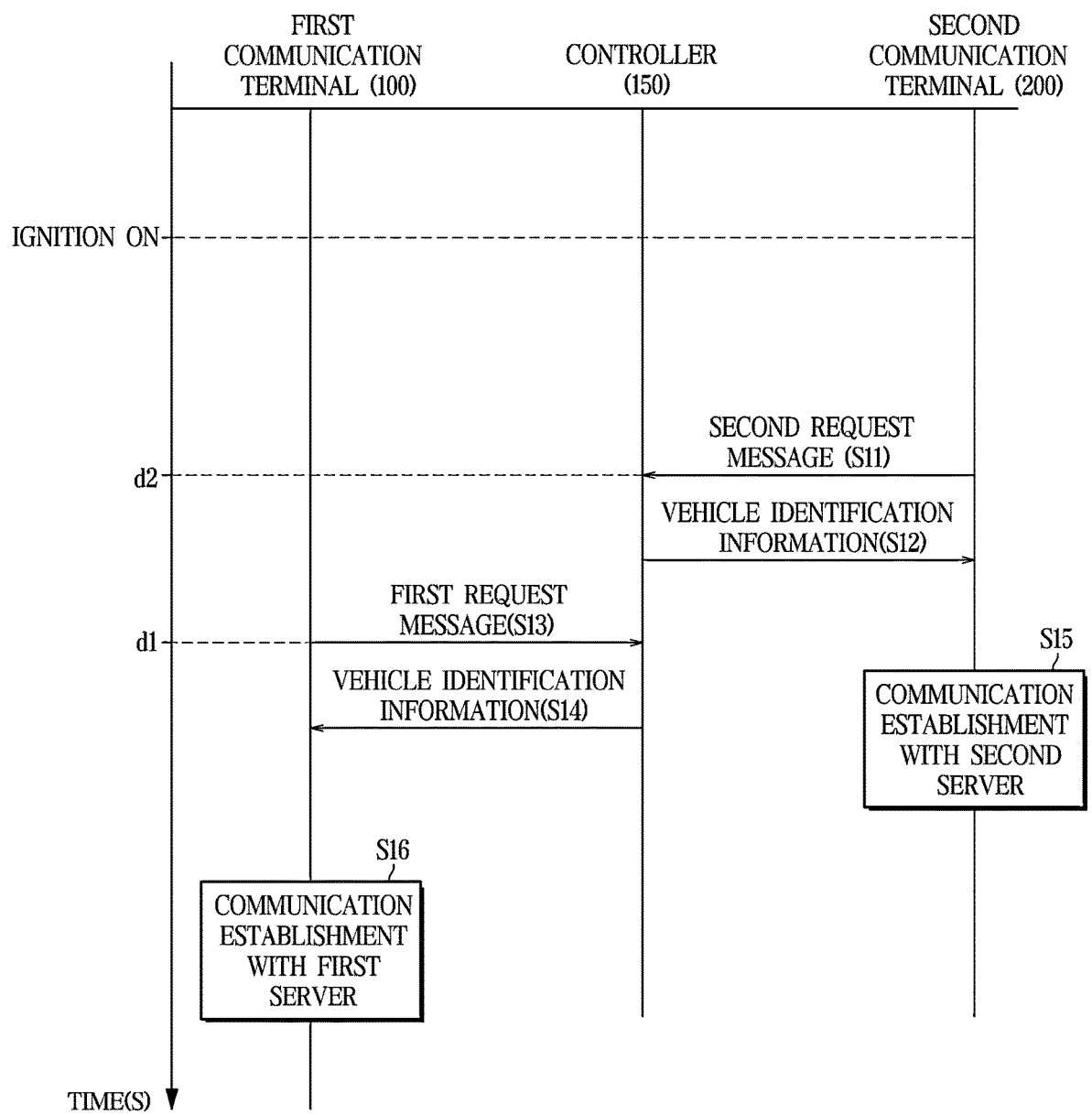
FIG. 3 schematically illustrates communication flows among a controller and a plurality of communication terminals provided in a vehicle according to an embodiment.

FIG. 3 schematically illustrates communication flows among a controller and a plurality of communication terminals provided in a vehicle according to an embodiment.

Referring to FIG. 3, the first communication terminal 100 and the second communication terminal 200 may be configured to transmit a request message to the controller 150 at different points in time.

According to various embodiments, the second communication terminal 200 may transmit, to the controller 150, a second request message for requesting vehicle identification information (S11) at a point in time d2 (hereinafter, 'second point in time') that a second preset period of time (e.g., approximately 8.5 seconds) has elapsed from a point in time that an ignition of the vehicle 1 was turned on.

In other words, the second communication terminal 200 may transmit the second request message to the controller 150, when the second preset period of time has elapsed based on the point in time that the ignition of the vehicle 1 was turned on.

In response to receiving the second request message, the controller 150 may transmit the vehicle identification information to the second communication terminal 200 (S12).

Meanwhile, the first communication terminal 100 may transmit, to the controller 150, a first request message for requesting the vehicle identification information (S13) at a point in time d1 (hereinafter, 'first point in time') that a first preset period of time (e.g., approximately 10.5 seconds) has elapsed from the point in time that the ignition of the vehicle 1 was turned on.

In other words, the first communication terminal 100 may transmit the first request message to the controller 150, when the first preset period of time has elapsed based on the point in time that the ignition of the vehicle 1 was turned on.

In this instance, the first preset period of time may be longer than the second preset period of time. Accordingly, the second point in time d2 may be earlier than the first point in time d1.

In response to receiving the first request message, the controller 150 may transmit the vehicle identification information to the first communication terminal 100 (S14).

That is, the first communication terminal 100 may transmit the first request message to the controller 150 only after the first point in time d1.

According to the disclosure, by differently setting the points in time that the first communication terminal 100 and the second communication terminal 200 perform diagnostic communication, a communication collision between the first communication terminal 100 and the second communication terminal 200 may be prevented.

According to various embodiments, the first communication terminal 100 may transmit the first request message to the controller 150 based on a third preset period of time (e.g., 8.5 seconds) having elapsed from a point in time that booting of the first communication terminal 100 is completed. Also, the second communication terminal 200 may transmit the second request message to the controller 150 based on the third preset period of time (e.g., 8.5 seconds) having elapsed from the point in time that the ignition of the vehicle 1 was turned on. Because the point in time that the ignition of the vehicle 1 is turned on is earlier than the point in time that booting of the first communication terminal 100 is completed, the second point in time d2 may be earlier than the first point in time d1.

Meanwhile, the second communication terminal 200 may establish communication with the second server 20 based on the vehicle identification information (S15), and the first communication terminal 100 may establish communication with the first server 10 based on the vehicle identification information (S16).

Figure 4:
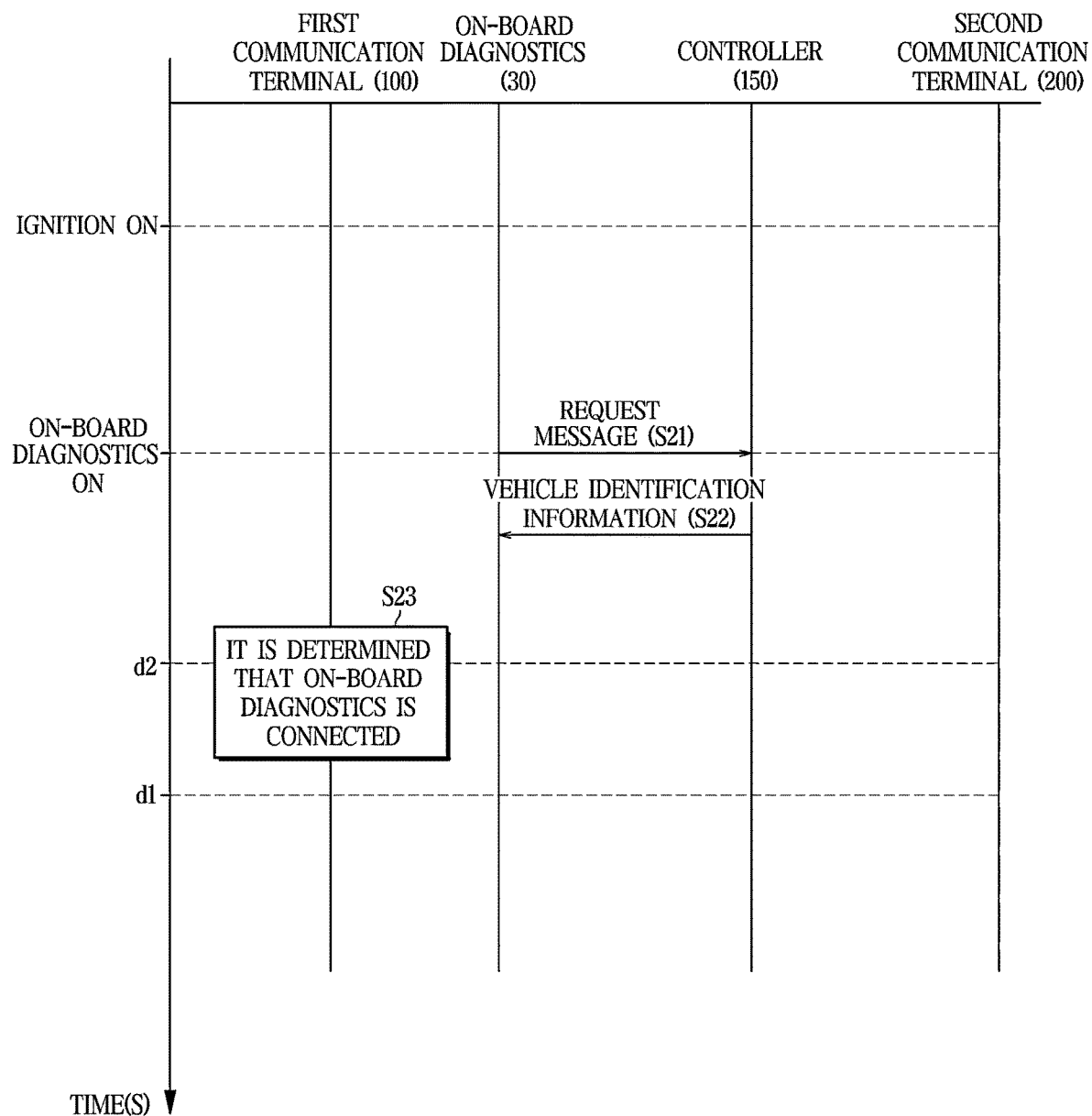
FIG. 4 schematically illustrates communication flows among a controller and a plurality of communication terminals, when an on-board diagnostics is connected to a vehicle according to an embodiment.

FIG. 4 schematically illustrates communication flows among a controller and a plurality of communication terminals, when an on-board diagnostics is connected to a vehicle according to an embodiment.

In an embodiment, the on-board diagnostics 30 may be designed to necessarily transmit a diagnostics connection message through a diagnostic communication protocol before requesting the controller 150 for vehicle identification information through diagnostic communication.

Accordingly, when the diagnostics connection message is confirmed, the first communication terminal 100 and/or the second communication terminal 200 may determine that the on-board diagnostics 30 is connected to the vehicle 1.

In other words, the first communication terminal 100 may confirm a connection state of the on-board diagnostics 30 before a first point in time d1.

Referring to FIG. 4, when the on-board diagnostics 30 is connected to the vehicle 1, the on-board diagnostics 30 may transmit a request message for requesting the vehicle identification information, to the controller 150 (S21).

In response to receiving the request message and/or a connection signal from the on-board diagnostics 30, the controller 150 may transmit the vehicle identification information to the on-board diagnostics 30 (S22).

Meanwhile, the first communication terminal 100 may confirm a diagnostic success message output from the controller 150. The diagnostic success message may refer to at least a portion of a message output from the controller 150 in response to a request message of a diagnostic device (e.g., the on-board diagnostics 30, the first communication terminal 100, the second communication terminal 200).

For example, a message output from the controller 150 in response to a request message of the diagnostic device may include information about whether a response to the request is successful, and the diagnostic success message may include information that the response to the request is successful.

When the diagnostic success message is output from the controller 150 before the first point in time d1, the first communication terminal 100 may determine a receiving object of the diagnostic success message based on the connection state of the on-board diagnostics 30.

For example, when the diagnostics connection message is confirmed before the diagnostic success message is output, the first communication terminal 100 may determine that the on-board diagnostics 30 is connected to the vehicle 1. When the diagnostics connection message is not confirmed before the diagnostic success message is output, the first communication terminal 100 may determine that the on-board diagnostics 30 is not connected to the vehicle 1.

Based on a determination that the on-board diagnostics 30 is connected to the vehicle 1, the first communication terminal 100 may determine the on-board diagnostics 30 as the receiving object of the diagnostic success message (S23).

By contrast, based on a determination that the on-board diagnostics 30 is not connected to the vehicle 1, the first communication terminal 100 may determine the second communication terminal 200 as the receiving object of the diagnostic success message.

Based on the determination that the on-board diagnostics 30 is the receiving object of the diagnostic success message, the first communication terminal 100 may not transmit a first request message to the controller 150 until an ignition of the vehicle 1 is turned off.

In other words, when the diagnostics connection message output from the on-board diagnostics 30 and the diagnostic success message output from the controller 150 are confirmed before the first point in time d1, the first communication terminal 100 may not transmit the first request message even when the first point in time d1 is reached.

According to various embodiments, when the diagnostic success message output from the controller 150 is confirmed before the second point in time d2, the second communication terminal 200 may be configured not to transmit a second request message to the controller 150.

Also, when the diagnostic success message output from the controller 150 is confirmed before receiving the vehicle identification information from the controller 150, the second communication terminal 200 may be configured not to transmit the second request message to the controller 150.

Accordingly, when the controller 150 transmits the vehicle identification information to the on-board diagnostics 30 or the first communication terminal 100, the second communication terminal 200 may not transmit the second request message to the controller 150 until the ignition of the vehicle 1 is turned off.

Meanwhile, with reference to FIGS. 3 and 4, based on a determination that the second communication terminal 200 is the receiving object of the diagnostic success message output from the controller 150 before the first point in time d1, the first communication terminal 100 may transmit the first request message to the controller 150 at the first point in time (S13).

In other words, even though the diagnostic success message output from the controller 150 before the first point in time d1 is confirmed, when the diagnostics connection message output from the on-board diagnostics 30 is not confirmed, the first communication terminal 100 may transmit the first request message to the controller 150 at the first point in time d1.

Specifically, the first communication terminal 100 may transmit the first request message to the controller 150, only when the receiving object of the diagnostic success message, output before a point in time that diagnostic communication is available, is determined as the second communication terminal 200.

According to the disclosure, even though the diagnostic success message is confirmed before the point in time that diagnostic communication is available, when the receiving object of the diagnostic success message is the second communication terminal 200, the first communication terminal 100 may establish communication with the first server 10.

Figure 5:
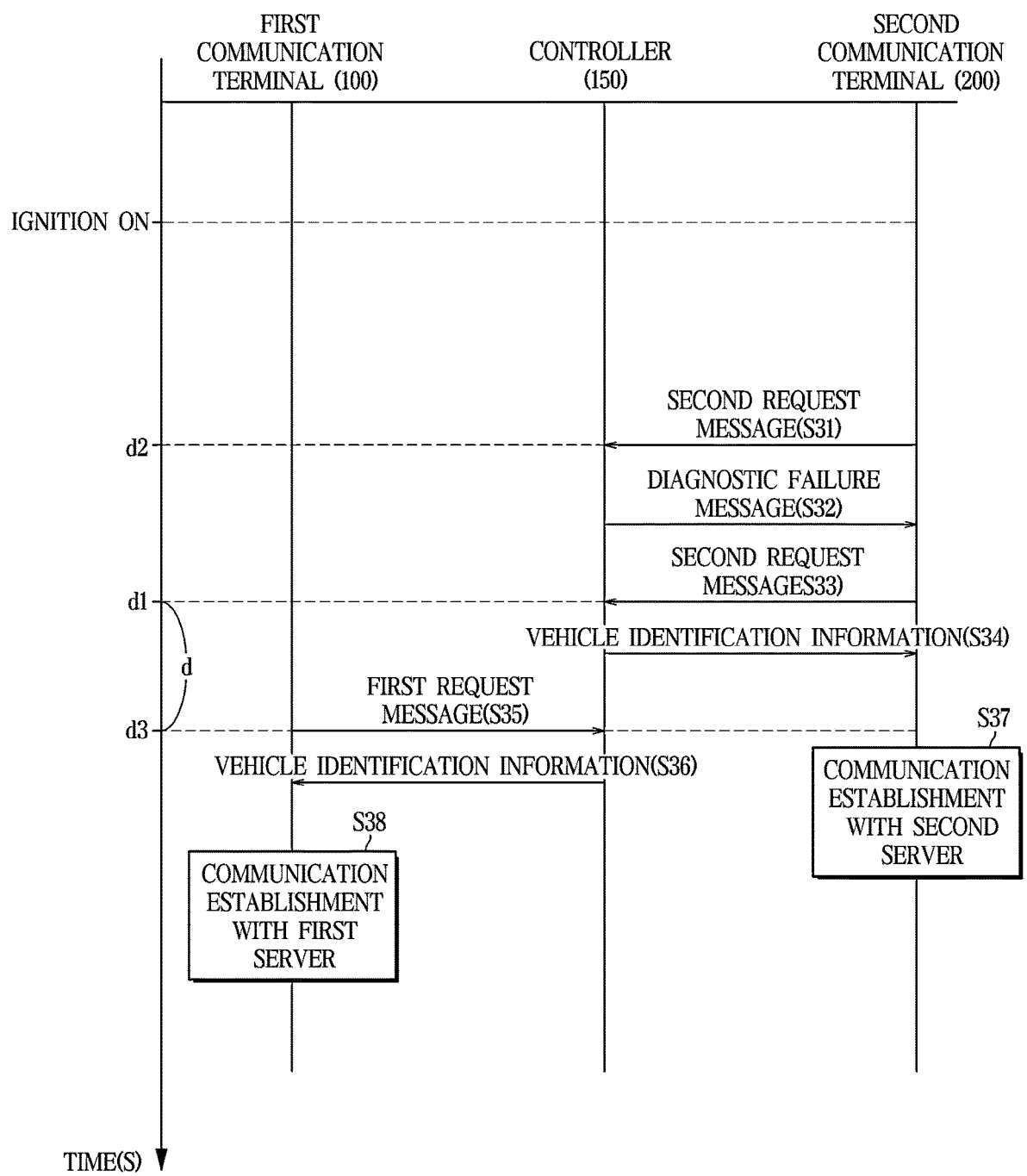
FIG. 5 schematically illustrates communication flows among a controller and a plurality of communication terminals, when a second communication terminal of a vehicle fails diagnostic communication according to an embodiment.

FIG. 5 schematically illustrates communication flows among a controller and a plurality of communication terminals, when a second communication terminal of a vehicle according to an embodiment fails diagnostic communication.

Referring to FIG. 5, the second communication terminal 200 may transmit a second request message to the controller 150 at a second point in time d2 (S31).

However, when various communication error causes (e.g., time out, diagnostic ID error, etc.) occur, the controller 150 may output a diagnostic failure message (S32). In other words, a preset condition for the controller 150 to transmit vehicle identification information to the second communication terminal 200 in response to the second request message is not satisfied, the controller 150 may output the diagnostic failure message (S32).

The diagnostic failure message may refer to at least a portion of a message output from the controller 150 in response to a request message of a diagnostic device (e.g., the on-board diagnostics 30, the first communication terminal 100, the second communication terminal 200).

For example, a message output from the controller 150 in response to a request message of the diagnostic device may include information about whether a response to the request is successful, and the diagnostic failure message may include information that the response to the request has failed.

Based on the received diagnostic failure message output from the controller 150, the second communication terminal 200 may retransmit the second request message to the controller 150 (S33).

Afterwards, when no other error cause occurs, the controller 150 may transmit the vehicle identification information to the second communication terminal 200 in response to the second request message (S34).

In other words, depending on various causes, the second communication terminal 200 may transmit the second request message to the controller 150 at a first point in time d1 after the second point in time d2.

However, when the first communication terminal 100 and the second communication terminal 200 simultaneously transmit a first request message and the second request message to the controller 150 at the first point in time d1, a communication collision occurs.

According to various embodiments, when the diagnostic failure message is output from the controller 150 before the first point in time d1, the first communication terminal 100 may transmit the first request message to the controller 150 at a third point in time d3 that a preset period of time d (e.g., approximately 5 seconds) has elapsed from the first point in time d1 (S35).

In this instance, the third point in time d3 refers to a point in time that the preset period of time d has elapsed based on the first point in time d1.

In other words, when the diagnostic failure message is output from the controller 150 before the first point in time d1, the first communication terminal 100 may transmit the first request message to the controller 150 at the third point in time d3 that the preset period of time d has elapsed from the first point in time d1, instead of outputting the first request message at the first point in time d1.

In response to receiving the first request message from the first communication terminal 100, the controller 150 may transmit the vehicle identification information to the first communication terminal 100 (S36).

Accordingly, without a communication collision, the second communication terminal 200 may establish communication with the second server 20 (S37), and the first communication terminal 100 may establish communication with the first server 10 (S38).

Figure 6:
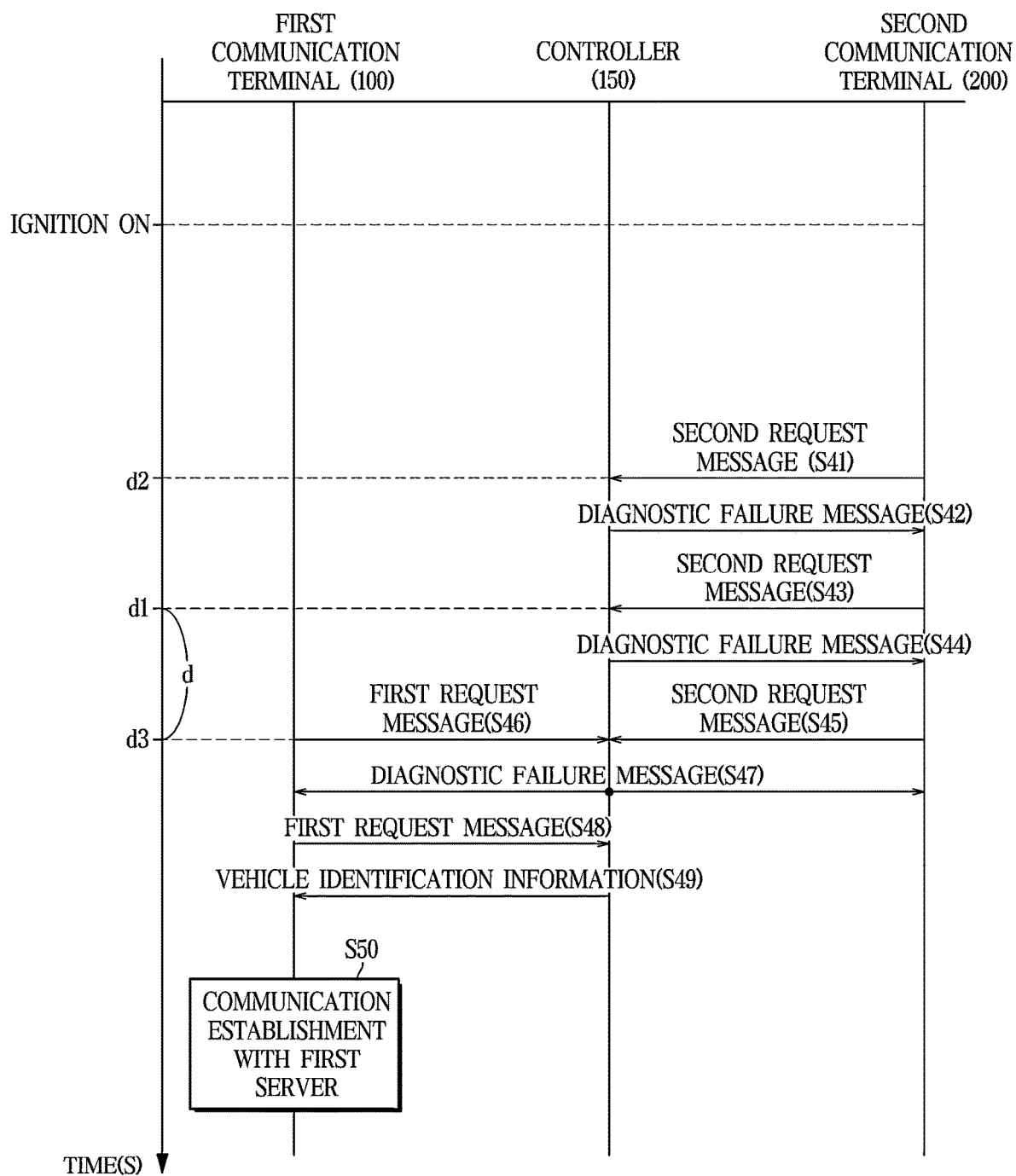
FIG. 6 schematically illustrates communication flows among a controller and a plurality of communication terminals, when a communication collision occurs among the plurality of communication terminals according to an embodiment.

FIG. 6 schematically illustrates communication flows among a controller and a plurality of communication terminals, when a communication collision occurs among the plurality of communication terminals according to an embodiment.

Referring to FIG. 6, identically to FIG. 5, the second communication terminal 200 may transmit a second request message to the controller 150 at a second point in time d2 (S41).

When various communication error causes occur, the controller 150 may transmit a diagnostic failure message to the second communication terminal 200 (S42).

Meanwhile, the second communication terminal 200 may retransmit the second request message to the controller 150 (S43), based on the received diagnostic failure message output from the controller 150. When the communication error cause continues to occur, however, the controller 150 may transmit the diagnostic failure message to the second communication terminal 200 again (S44).

In the meantime, as described above with reference to FIG. 5, when the diagnostic failure message is output from the controller 150 before the first point in time d1, the first communication terminal 100 may transmit a first request message to the controller 150 at a third point in time d3 that a preset period of time d (e.g., approximately 5 seconds) has elapsed from the first point in time d1 (S46).

At the same time, based on the received diagnostic failure message output from the controller 150, the second communication terminal 200 may retransmit the second request message to the controller 150 at the third point in time d3 (S45).

As such, when the first communication terminal 100 and the second communication terminal 200 simultaneously transmit the first request message and the second request message to the controller 150, respectively, the controller 150 may transmit a diagnostic failure message to the first communication terminal 100 and the second communication terminal 200 due to a diagnostic communication collision (S47).

In other words, the controller 150 may output the diagnostic failure message based on an occurrence of the communication collision between the first and second request messages.

In this instance, a communication error cause may be a diagnostic communication collision between the first and second request messages.

Despite several attempts to perform diagnostic communication with the controller 150 before the third point in time d3, the second communication terminal 200 has failed to receive vehicle identification information from the controller 150.

Accordingly, even though the second communication terminal 200 continuously attempts to transmit the second request message to the controller 150, the attempt is highly unlikely to be successful due to a variety of communication failure causes.

According to various embodiments, when receiving the diagnostic failure message output based on the occurrence of the collision between the first and second request messages, the first communication terminal 100 may retransmit the first request message to the controller 150 after a preset period of time (e.g., approximately seconds) (S48).

Afterwards, when no other error cause occurs, the controller 150 may transmit the vehicle identification information to the first communication terminal 100 in response to the first request message (S49). The first communication terminal 100 may establish communication with the first server 10 based on the vehicle identification information (S50).

Meanwhile, when receiving the diagnostic failure message output based on the occurrence of the collision between the first and second request messages, the second communication terminal 200 may not transmit the second request message to the controller 150 until an ignition of the vehicle 1 is turned off.

In other words, the second communication terminal 200 is incapable of reattempting diagnostic communication with the controller 150 after the diagnostic communication collision.

According to the disclosure, an unnecessary diagnostic communication attempt of the second communication terminal 200 may be prevented, and diagnostic communication with the first communication terminal 100 may be established.

Meanwhile, according to various embodiments, because the first communication terminal 100 may be implemented in an integrated form in an AVN device of the vehicle 1, various information may be notified to a user.

Accordingly, based on the received diagnostic failure message output based on the occurrence of the collision between the first and second request messages, the first communication terminal 100 may output a visual feedback and/or audible feedback for notifying that a communication error of the second communication terminal 200 has occurred.

According to the disclosure, a communication collision between communication terminals exchanging data using a diagnostic communication protocol may be prevented efficiently.

Also, according to the disclosure, by clearly determining a receiving object of a diagnostic success message based on a connection state of an external diagnostic device (e.g., the on-board diagnostics 30), the first communication terminal 100 may be prevented from being in a communication-disabled state.

Figure 7:
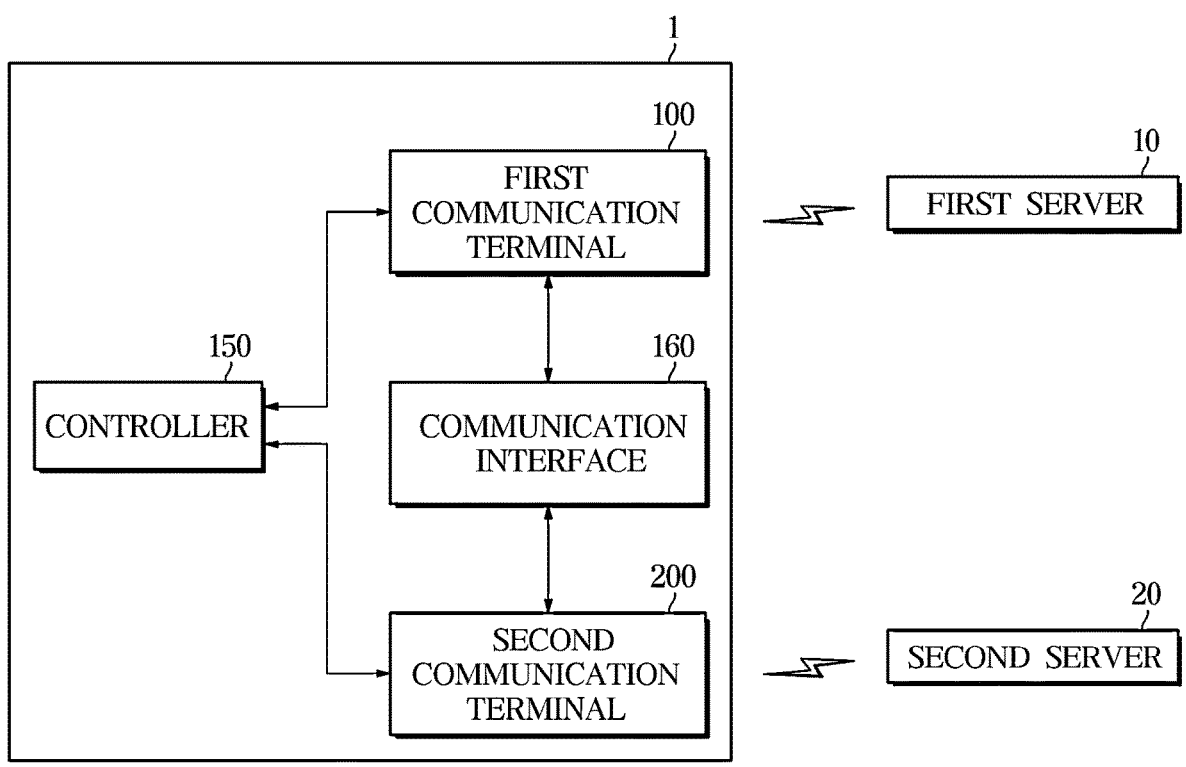
FIG. 7 is a block diagram schematically illustrating a configuration of a vehicle according to another embodiment.

FIG. 7 is a block diagram schematically illustrating a configuration of a vehicle according to another embodiment.

Referring to FIG. 7, the vehicle 1 according to another embodiment may include a first communication terminal 100, a second communication terminal 200, and a controller 150, as described above with reference to FIG. 2. The first communication terminal 100 may communicate with the first server 10 through a base station of mobile telecommunications operator. The second communication terminal 200 may communicate with the second server 20 through a base station of mobile telecommunications operator.

Meanwhile, the vehicle 1 according to another embodiment may further include a communication interface 160 for communicating with the first communication terminal 100 and the second communication terminal 200.

The first communication terminal 100 and the second communication terminal 200 may directly exchange data through the communication interface 160.

The communication interface 160 may include any kind of communication means that enable communication among terminals. For example, the communication interface 160 may include a wired communication means (e.g., wire), and a wireless communication means (e.g., Bluetooth).

Figure 8:
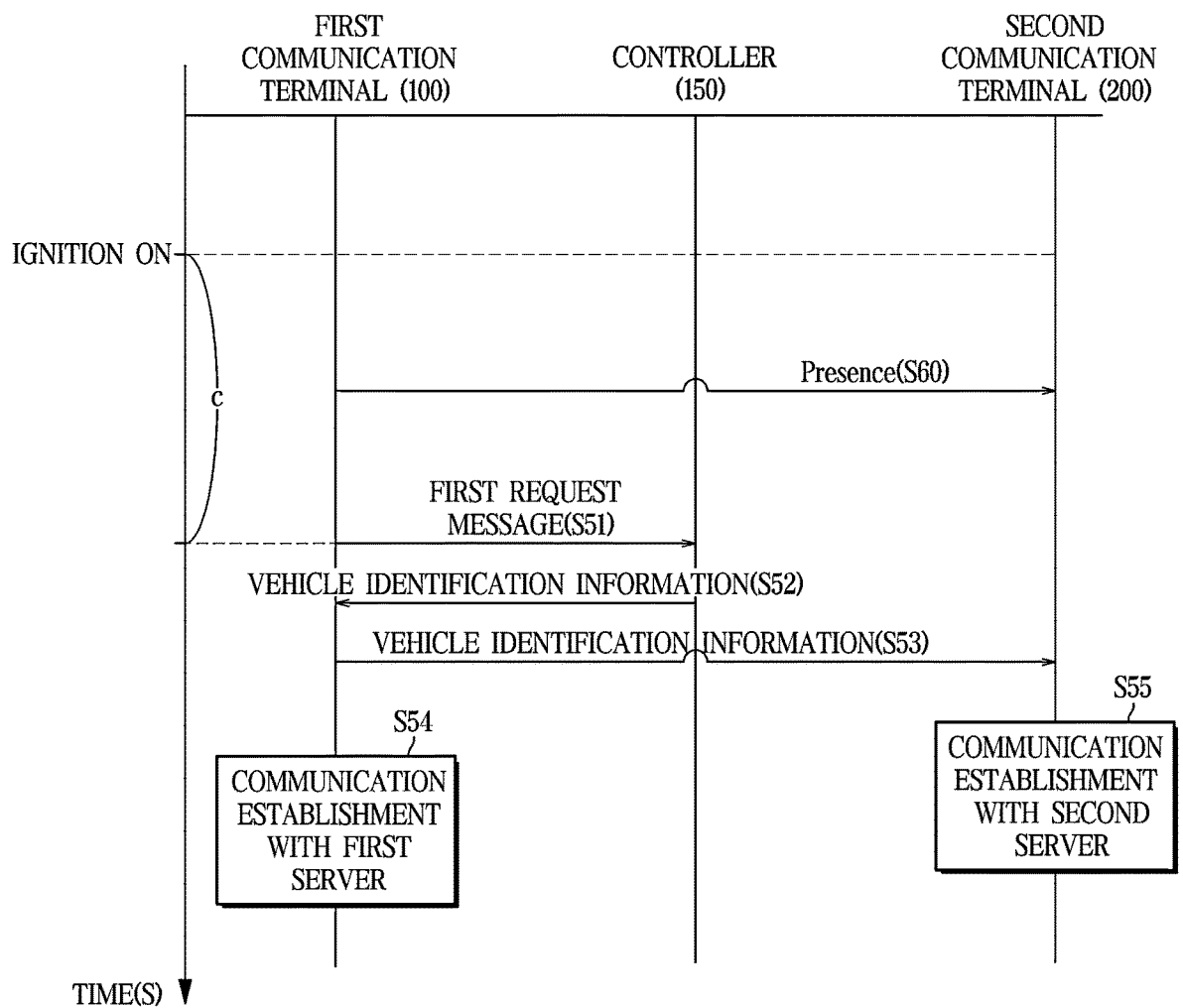
FIG. 8 schematically illustrates communication flows among a controller and a plurality of communication terminals provided in a vehicle according to another embodiment.

FIG. 8 schematically illustrates communication flows among a controller and a plurality of communication terminals provided in a vehicle according to another embodiment.

Referring to FIG. 8, based on completion of booting, the first communication terminal 100 may transmit information that the first communication terminal 100 is present in the vehicle 1, i.e., information that the first communication terminal 100 is provided in the vehicle 1, to the second communication terminal 200 through the communication interface 160 (S60). Based on the received information that the first communication terminal 100 is present in the vehicle 1, the second communication terminal 200 may not transmit a second request message to the controller 150.

Based on a preset period of time c (e.g., approximately 8.5 seconds) having elapsed from a point in time that an ignition of the vehicle 1 was turned on, the first communication terminal 100 may transmit, to the controller 150, a request message for requesting vehicle identification information (S51). In this instance, a point in time that the preset period of time c has elapsed from the point in time that the ignition of the vehicle 1 was turned on may be earlier than the first point in time d1 of FIGS. 3-6. Also, the point in time that the preset period of time c has elapsed from the point in time that the ignition of the vehicle 1 was turned on may be identical to the second point in time d2.

As described above, the first communication terminal 100 may determine whether to transmit a first request message based on a connection state of the on-board diagnostics 30.

For example, based on the on-board diagnostics connected to the vehicle 1, the first communication terminal 100 may not output the first request message until the ignition of the vehicle 1 is turned off. Also, based on the on-board diagnostics not connected to the vehicle 1, the first communication terminal 100 may output the first request message at a point in time that the preset period of time c has elapsed from the point in time that the ignition of the vehicle 1 was turned on.

In response to receiving the first request message, the controller 150 may transmit the vehicle identification information to the first communication terminal 100 (S52).

Afterwards, the first communication terminal 100 may establish communication with the first server 10 (S54).

Meanwhile, because a direct communication between the first communication terminal 100 and the second communication terminal 200 is available, the first communication terminal 100 may transmit the vehicle identification information to the second communication terminal 200 through the communication interface 160, based on the received vehicle identification information from the controller 150 (S53).

Accordingly, the second communication terminal 200 may also establish communication with the second server 20 based on the vehicle identification information received from the first communication terminal 100 (S55).

Meanwhile, when the first communication terminal 100 is not present in the vehicle 1, the second communication terminal 200, which does not receive information that the first communication terminal 100 is present in the vehicle 1, transmits a second request message to the controller 150.

According to the disclosure, when communication between the first communication terminal 100 and the second communication terminal 200 is available, diagnostic communication between the first communication terminal 100 and the second communication terminal 200 may be prevented in advance.

As is apparent from the above, according to the embodiments of the disclosure, a communication collision among a plurality of communication terminals provided in a vehicle can be prevented.

Also, a telematics terminal can clearly identify a subject of diagnostic communication performed previously, and thus a telematics service may be prevented from not being provided even when an on-board diagnostics is not connected to a vehicle.

Although the embodiments of the vehicle preventing a communication collision and the method for preventing a communication collision between communication terminals provided in the vehicle have been shown and described, the above embodiments are illustrative purpose only. It should be appreciated by those having ordinary skill in the art that changes and modifications, which have not been illustrated above, may be made in these embodiments without departing from the principles and scope of the present disclosure, the scope of which is defined in the claims and their equivalents.

Meanwhile, the embodiments of the disclosure can be stored in the form of a recording medium storing computer-executable instructions. The instructions may be stored in the form of a program code, and when executed by a processor, the instructions may perform operations of the disclosed embodiments. The recording medium may be implemented as a computer-readable medium.

The computer-readable recording medium includes all kinds of recording media in which instructions, which may be decoded by a computer are stored, for example, a read only memory (ROM), random access memory (RAM), magnetic tapes, magnetic disks, flash memories, optical recording medium, and the like.

What is claimed is:

1. A vehicle, comprising:
   a first communication terminal provided in the vehicle;
   a second communication terminal provided in the vehicle; and
   a controller configured to transmit vehicle identification information of the vehicle to the first communication terminal or the second communication terminal according to a request from the first communication terminal or the second communication terminal,
   wherein the first communication terminal is configured to transmit, to the controller, a first request message for requesting the vehicle identification information at a first point in time that a first preset period of time has elapsed from a point in time that an ignition of the vehicle was turned on,
   wherein the second communication terminal is configured to transmit, to the controller, a second request message for requesting the vehicle identification information at a second point in time that a second preset period of time has elapsed from the point in time that the vehicle's ignition was turned on,
   wherein the second preset period of time is shorter than the first preset period of time, and
   wherein, in response to a diagnostic success message being output from the controller before the first point in time, the first communication terminal is configured to determine a receiving object of the diagnostic success message based on a connection state of an on-board diagnostics.

2. The vehicle of claim 1, wherein the first communication terminal is configured to
   determine the on-board diagnostics as the receiving object of the diagnostic success message based on a determination that the on-board diagnostics is connected to the vehicle, and
   determine the second communication terminal as the receiving object of the diagnostic success message based on a determination that the on-board diagnostics is not connected to the vehicle.

3. The vehicle of claim 1, wherein the first communication terminal is configured to transmit the first request message to the controller at the first point in time, based on a determination that the receiving object of the diagnostic success message is the second communication terminal.

4. The vehicle of claim 1, wherein the first communication terminal is configured not to transmit the first request message to the controller until the vehicle's ignition is turned off, based on a determination that the receiving object of the diagnostic success message is the on-board diagnostics.

5. The vehicle of claim 1, wherein, in response to a diagnostic failure message being output from the controller before the first point in time, the first communication terminal is configured to transmit the first request message to the controller at a third point in time that a preset period of time has elapsed from the first point in time, instead of outputting the first request message at the first point in time.

6. The vehicle of claim 1, wherein the second communication terminal is configured not to transmit the second request message to the controller until the vehicle's ignition is turned off, based on a diagnostic success message output from the controller.

7. The vehicle of claim 1, wherein
   the controller is configured to output a diagnostic failure message based on an occurrence of a collision between the first request message and the second request message,
   the first communication terminal is configured to retransmit the first request message to the controller after a threshold period of time elapses, based on the received diagnostic failure message, and
   the second communication terminal is configured not to transmit the second request message to the controller until the vehicle's ignition is turned off, based on the received diagnostic failure message.

8. The vehicle of claim 1, wherein
   the first communication terminal is configured to establish communication with a first server providing an infotainment service, based on the received vehicle identification information, and
   the second communication terminal is configured to establish communication with a second server providing an eCall service, based on the received vehicle identification information.

9. A method for preventing a communication collision between a first communication terminal provided in a vehicle and a second communication terminal provided in the vehicle, the method comprising:
   transmitting, by the first communication terminal, a first request message for requesting vehicle identification information of the vehicle to a controller at a first point in time that a first preset period of time has elapsed from a point in time that an ignition of the vehicle was turned on;
   transmitting, by the second communication terminal, a second request message for requesting the vehicle identification information to the controller at a second point in time that a second preset period of time has elapsed from the point in time that the vehicle's ignition was turned on, the second preset period of time being shorter than the first preset period of time; and
   in response to a diagnostic success message being output from the controller before the first point in time, determining, by the first communication terminal, a receiving object of the diagnostic success message based on a connection state of an on-board diagnostics.

10. The method of claim 9, wherein determining the receiving object of the diagnostic success message comprises:
    determining the on-board diagnostics as the receiving object of the diagnostic success message based on a determination that the on-board diagnostics is connected to the vehicle; and
    determining the second communication terminal as the receiving object of the diagnostic success message based on a determination that the on-board diagnostics is not connected to the vehicle.

11. The method of claim 9, wherein transmitting the first request message to the controller by the first communication terminal is performed only when the receiving object of the diagnostic success message is determined as the second communication terminal.

12. The method of claim 9, further comprising:
    not transmitting, by the first communication terminal, the first request message to the controller until the vehicle's ignition is turned off, based on a determination that the receiving object of the diagnostic success message is the on-board diagnostics.

13. The method of claim 9, further comprising:

in response to a diagnostic failure message being output from the controller before the first point in time, transmitting, by the first communication terminal, the first request message to the controller at a third point in time that a preset period of time has elapsed from the first point in time, instead of outputting the first request message at the first point in time.

14. The method of claim 9, further comprising:

not transmitting, by the second communication terminal, the second request message to the controller until the vehicle's ignition is turned off, based on a diagnostic success message output from the controller.

15. The method of claim 9, further comprising:

outputting, by the controller, a diagnostic failure message based on an occurrence of a collision between the first request message and the second request message;

retransmitting, by the first communication terminal, the first request message to the controller after a threshold period of time elapses, based on the received diagnostic failure message; and not transmitting, by the second communication terminal, the second request message to the controller until the vehicle's ignition is turned off, based on the received diagnostic failure message.

16. The method of claim 9, wherein the first communication terminal is configured to establish communication with a first server providing an infotainment service, based on the received vehicle identification information, and the second communication terminal is configured to establish communication with a second server providing an eCall service, based on the received vehicle identification information.

17. A vehicle, comprising:

a first communication terminal provided in the vehicle;

a second communication terminal provided in the vehicle;

a communication interface for communication of the first communication terminal and the second communication terminal; and a controller configured to transmit vehicle identification information of the vehicle to the first communication terminal according to a request from the first communication terminal, wherein the first communication terminal is configured to
determine whether to transmit a request message for requesting the vehicle identification information based on a connection state of an on-board diagnostics to the vehicle, in response to the on-board diagnostics not connected to the vehicle, transmit, to the controller, the request message, based on a preset period of time having elapsed from a point in time that an ignition of the vehicle was turned on, transmit, to the second communication terminal, the vehicle identification information through the communication interface based on the received vehicle identification information from the controller, and in response to the on-board diagnostics connected to the vehicle, not to transmit, to the controller, the request message.

* * * * *